UNITED STATES PATENT OFFICE.

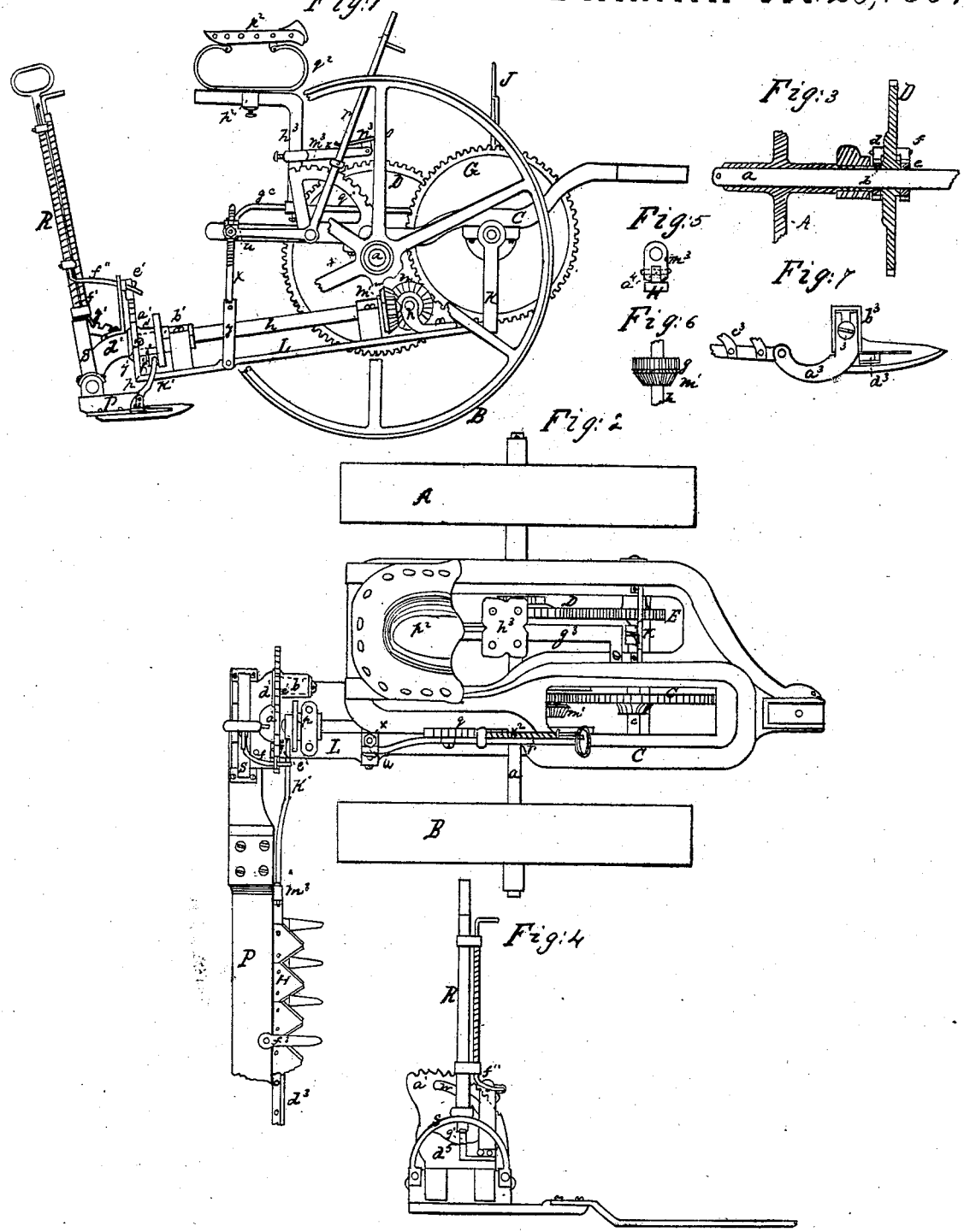

JOHN P. VAN SICKLE, OF GENEVA, NEW YORK.

IMPROVEMENT IN HARVESTERS.

Specification forming part of Letters Patent No. 96,170, dated October 26, 1869.

*To all whom it may concern:*

Be it known that I, JOHN P. VAN SICKLE, of Geneva, in the State of New York, have invented a new and useful Harvester; and I do hereby declare that the following is a full, clear, and exact description thereof, reference being had to the accompanying drawing, making part of this specification, in which—

Figure 1 is a side elevation with a portion of driving-wheel B broken away. Fig. 2 is a top view. Fig. 3 is a sectional view of the axle $a$ and hub of wheel A and ratchets $b$ and $e$ and pawls $d$ and $f$. Fig. 4 is a side elevation of the plate $a^1$ and handle R, showing the arm $d^1$ and hinge connecting the cutter-bar P to arm $d^1$. Fig. 5 is an end view of the strap which connects the pitman to the eyebolt in the knife, and also the eyebolt. Fig. 6 is a top view of shaft $h$ with the pinion $g$ and miter-wheel $m^1$. Fig. 7 is a side elevation of the shoe and out-end guard and portion of the track-clearer.

The nature of my invention will be understood from the specification and drawings.

To enable others skilled in the art to make and use my machine, I will describe its construction and operation.

The main frame C is so formed that a portion in front of the axle $a$, carrying the gearing, is raised above the rear, so as to elevate the counter-shaft $c$. The portion of the frame C to which the tongue is attached is still farther raised, so that the tongue will be elevated more in the line of draft. The main frame C is attached to the axle $a$, carried by two ground and driving wheels, A and B. The wheel A is loose on the axle, and the wheel B is rigidly attached. The hub of the wheel A extends to the inside of the frame, and has a ratchet-wheel, $b$, Fig. 3, formed on the inner end. I place a spur-wheel, D, on the axle $a$, which meshes into a pinion, E, Fig. 2, on the shaft $c$, suspended to the under part of the front of the frame C. On the spur-wheel D, I place a pawl, $d$, Fig. 3, which is held in the ratchet-wheel $b$ by a spring, and so arranged that when the machine moves ahead it engages the spur-wheel D, and causes it to revolve with the driving-wheel A, and when the driving-wheel A has a backward motion the spur-wheel D may remain still, or be moved by the wheel B. On the inside of the spur-wheel D, I fix rigidly to the axle $a$ another ratchet-wheel, $e$, Fig. 3, and a similar pawl, $f$, to this side of wheel D. By this arrangement the ground-wheels A and B are combined or separate in their action on the spur-wheel D as the machine moves ahead or turns around.

The pinion E, Fig. 2, is loose on the shaft $c$, and may be caused to revolve with it by the clutch $k$, Fig. 2, and handle J, Fig. 1, so that the knife can be set in motion at pleasure. Near the end of the shaft $c$, opposite to the pinion E, I key a spur-wheel, G, Figs. 1 and 2, which meshes into a pinion, $g$, Fig. 6, on the shaft $h$. The shaft $h$, Figs. 1 and 6, is carried in journal-boxes on the bar L, which is pivoted to the front of the frame by the hanger K. The bar L runs back to the rear of the machine a suitable distance for the location of the cutter-bar P, Figs. 1 and 2. On the shaft $h$ a miter-wheel, $m$, is keyed, which gears into a miter-wheel, $m^1$, on the shaft $n$, Figs. 1 and 2. This shaft is sustained by journal-boxes resting on the bar L and extends to the rear of the machine, and has on its outer end a crank, $p$, to which the knife-pitman $k'$ is attached. On the rear end of the frame C, I bolt a rack, $q$, Figs. 1 and 2, in form of a segment of a circle, and by its lower side I pivot an angle-shaped lever, $r$, Figs. 1 and 2. To the upper part of this lever is attached a pawl, $x^2$, Fig. 2, that is kept in the ratchet $q$ by a spiral spring, and holds the lever as desired, longitudinally, and its attachment in any desired vertical adjustment, thereby raising or lowering the inner end of the cutter-bar at the pleasure of the driver.

To the outer end of the longitudinal portion of the lever $r$ there is attached a swiveled bolt, $u$, Figs. 1 and 2, in the end of which a hole is provided for the supporting-rod $x$, which moves loosely therein. The rod $x$ at its lower end is attached to a yoke, $y$, Fig. 1, which is pivoted to the bar L and supports its rear end. The sustaining-rod $x$, moving freely in the swiveled bolt $u$, allows the inner end of the cutter-bar to rise if it should come in contact with any unevenness on the ground. On the out end of the bar L, I bolt a plate, $a^1$, Figs. 1, 2, and 4, the top of which is round and has ratchet-notches. On the left-hand corner of this plate, near the bottom, a journal-box, $b^1$, Figs. 1 and 2, is formed, in which the pivoted shaft $c^1$ (shown in dotted lines Figs. 1 and 2) of the cutter-bar is sustained and operates. On the cutter-bar P, Figs. 1 and 2, a circular arm, $d^1$, Figs. 1 and 2, is pivoted by a hinge. To this arm is attached the pivoted sustaining-shaft $c^1$.

To the front of the arm $d^1$ a pin, $y^2$, Fig. 1, is attached, which operates in a circular slot, $w$, Fig. 4, in the plate $a^1$, and is held by a key in the end, thus steadying the cutter-bar. By this arrangement the outer end of the cutter-bar P can be elevated or depressed by the handle R, Figs. 1 and 4, this handle being held in any desired adjustment, transversely, by the pawl $e'$, operating in the ratchets of the plate $a^1$, and the connecting-rod $f''$, Figs. 1, 2, and 4.

The handle R is sustained by a yoke, S, Figs. 1 and 4, which is attached rigidly to that portion of the hinge on the cutter-bar P, thereby having a longitudinal as well as a transverse adjustment in relation to the travel of the machine, and is held in its longitudinal adjustment by the rack $g^1$ and pawl $f^1$. By this means any desired elevation can be given to the front edge of cutter-bar by moving the handle R longitudinally.

On the end of the finger-bar a standard, $b^3$, Fig. 7, is bolted, having in its outside a groove to receive the vertical arm of the shoe $a^3$. This arm has a slot in it, through which a screw, 3, is passed into the standard $b^3$ to hold it, and at the same time to allow the shoe to be vertically adjustable, so as to raise or depress the finger-bar P.

The shoe $a^3$, Fig. 7, extends out in rear of the finger-bar, so that a longer resting surface is afforded, that it may pass easily over depressions in the ground. To the end of the shoe $a^3$ the track clearer $c^3$, Fig. 7, is pivoted.

To the front edge of the finger-bar P a metal plate, $d^3$, having a raised front side, as shown in Figs. 7 and 2, is attached, and held in its place by the guards. This plate has several perforations, as shown in Fig. 2, to allow dust to pass out, and it forms, in connection with the finger-bar, a groove for the bar holding the knives to run in.

Two or more of the guards $f^3$, Fig. 2, are made with closed tops, and are riveted in the rear of the knife, thus sustaining it in its position.

The pitman $k'$ is attached to the knife H by a strap, $m^3$, that is pivoted to an eyebolt, $a^4$, Figs. 1 and 5. This allows the cutter-bar to be elevated at pleasure and have the knife in motion.

To the top of the frame C, and extending from the rear nearly to the front, I bolt a metal bar, $g^3$, Figs. 1 and 2. To this bar I attach, by means of a socket, a standard, $h^3$, Fig. 1, having its top bent toward the rear of the machine. This standard is movable along the bar and fastened by a clamp-screw. On the upright portion I attach an arm, $m^4$, by a socket and set-screw, which allow the arm $m^4$ to be vertically adjusted.

To the arm $m^4$ a foot-rest, $n^3$, Figs. 1 and 2, is pivoted, to allow it to adjust itself to the position of the foot of the driver.

On the longitudinal portion of the standard $h^3$ a movable cross-bar, $p^2$, is placed, which is held in any desirable longitudinal adjustment by a set-screw.

To the cross-bar $p^2$ two springs, $q^2$, Fig. 1, are bolted, made in the form shown in Fig. 2, and on these springs the driver's seat $r^2$, Figs. 1 and 2, is bolted.

The operation of this machine is as follows: When it is moved forward both driving-wheels operate on the spur-wheel D by the pawls $f$ and $d$ and ratchet-wheels $b$ $e$, which communicate motion to the knife through pinions E, miter-wheels $m$ $m^1$, shaft $n$, and pitman $k$. When the machine is turning around, either driving-wheel may give motion to the knife, by means of its corresponding pawl and ratchet-wheel, thus giving, in their combined or independent action, motion to the knife. By the levers R and $r$ and the arrangement of the shoe, as shown, any desirable adjustment is given to the cutter-bar.

By the peculiar shape of the frame C, as shown in the drawings, the gearing is kept farther from the ground, and the whiffletrees are raised above or near the top of the grass, and are prevented from throwing it away from the knife.

The standard $h^3$ being movable longitudinally allows the seat to be placed so as to balance the machine according to the weight of the driver, and the seat being adjustable in the same direction assists in this, as well as to accommodate, with the adjustable foot-rest, the position of the driver.

The seat being sustained on the springs shown in the drawings, an easy and desirable motion is obtained, and the driver is not liable to be thrown off.

The hub of the driving-wheel A, extending into the inside of the main frame, contracts the gearing to a compact compass, and locates it so that dirt falling from the driving-wheels will not get on the gear-wheels.

The bar P, being sustained by the vertically-moving rod $x$ in the rear, allows the cutter-bar to rise over any projections on the ground without strain on the adjusting-lever $r$, or altering the elevation of the front of the cutter-bar.

By this arrangement of gear-wheels the finger-bar P and the crank-shaft $n$ bear the same relative position to each other in any vertical adjustment of the inner end of the finger-bar.

What I claim as my invention, and desire to secure by Letters Patent, is—

1. The main frame C of harvesters, when so constructed that a portion carrying the counter-shaft $c$ is elevated above the rear part, and the portion to which the tongue is attached is still farther elevated, as and for the purpose set forth.

2. Suspending the bar L, by the hanger K, from the main frame C, and from the anglelever $r$, by the vertically-moving connecting-rod $x$, pivoted eyebolt $u$, and yoke $y$, as herein described, and for the purpose set forth.

3. The hinged finger-bar P and pivoted arm $d^1$, in combination with the handle R, when said handle is adjustable longitudinally and transversely to the machine, as and for the purpose set forth.

4. The vertically-adjustable arm $m^4$, pivoted foot-rest $n^3$, in combination with the horizontal adjustable seat $r^2$, as herein shown, and for the purpose set forth.

5. The seat $r^2$, in combination with the springs $q^2$, constructed as herein shown, and for the purpose set forth.

6. The pivoted track-clearer $c^3$, in combination with the adjustable shoe $a^3$, as herein shown and described.

JOHN P. VAN SICKLE.

Witnesses:
F. H. CLEMENT,
J. L. GAGE.